Sept. 1, 1959 H. W. LEIDY ET AL 2,902,597
AIR-BORNE PACKAGING UNIT FOR ELECTRONIC EQUIPMENT
Filed Sept. 12, 1956 2 Sheets-Sheet 1
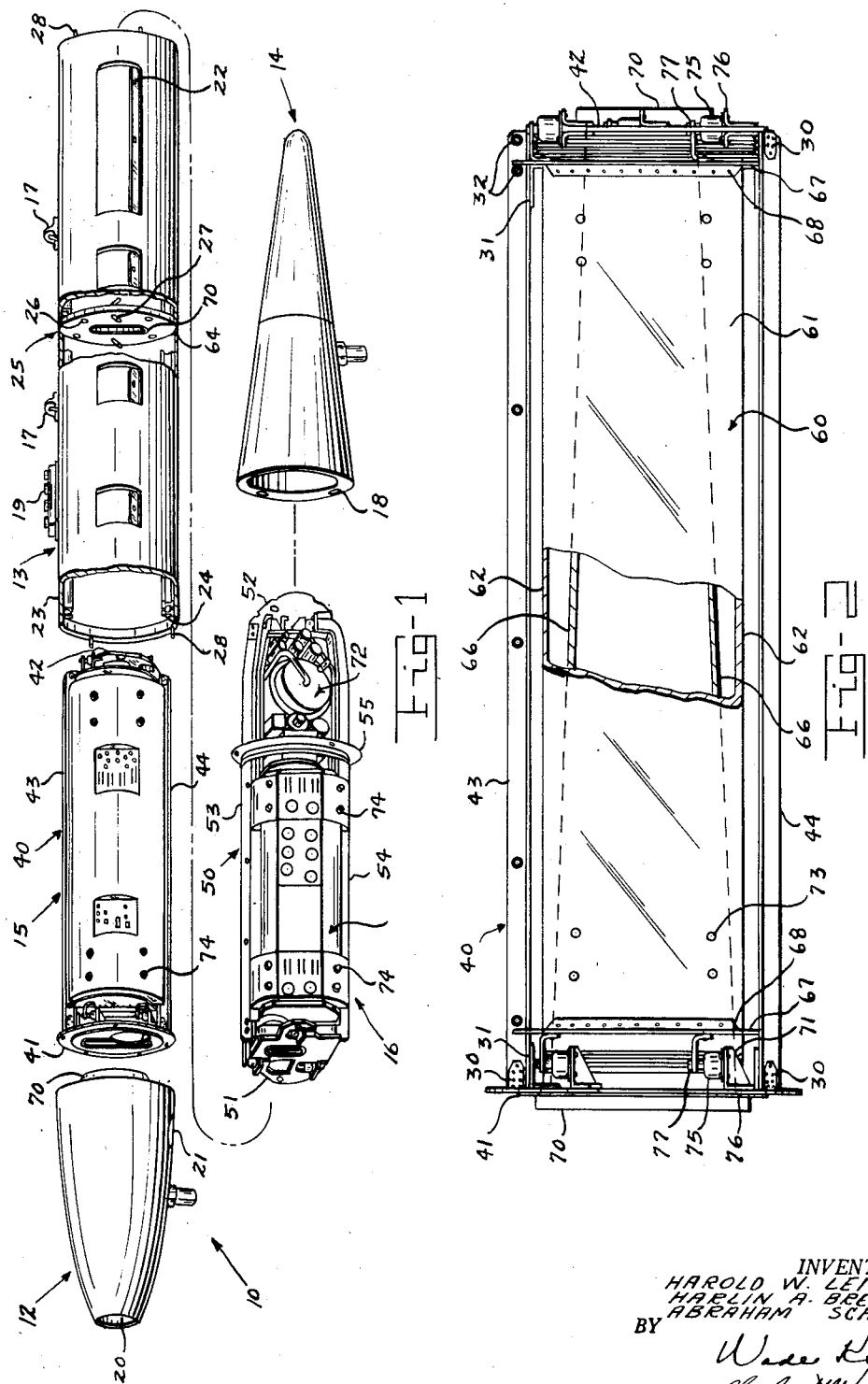
INVENTORS
HAROLD W. LEIDY
HARLIN A. BRELSFORD
ABRAHAM SCHNAPF
BY
ATTORNEYS

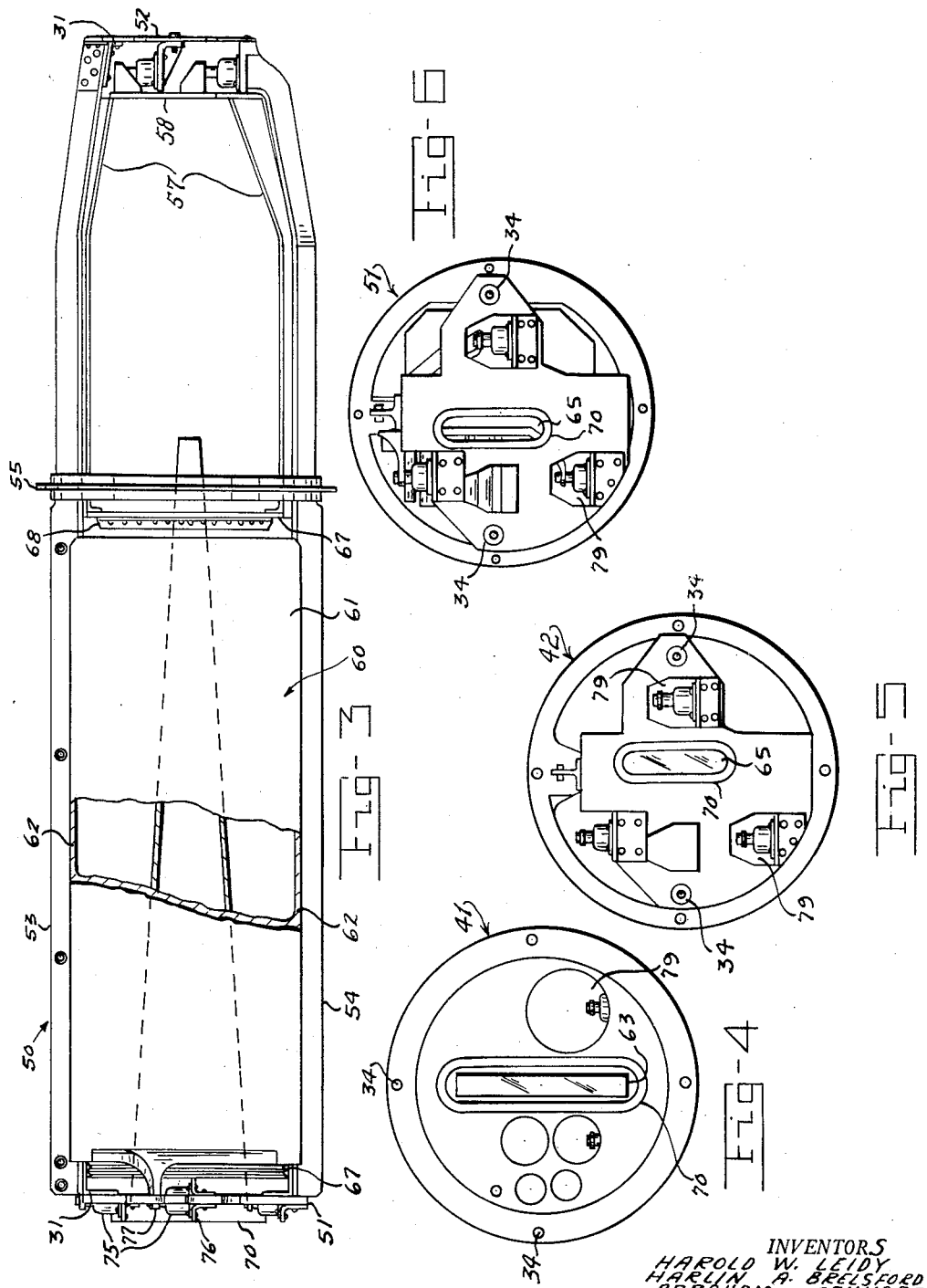

2,902,597
Patented Sept. 1, 1959

2,902,597

AIR-BORNE PACKAGING UNIT FOR ELECTRONIC EQUIPMENT

Harold W. Leidy, Westmont, Harlin A. Brelsford, Colwick, and Abraham Schnapf, Camden, N.J., assignors to the United States of America as represented by the Secretary of the Air Force Application September 12, 1956, Serial No. 609,511

9 Claims. (Cl. 250—14)

The present invention relates to a cooled support apparatus for the packaging of electronic equipment within an external container, and more particularly, to a ducted central supporting frame for removable, compact mounting and effective cooling of a plurality of electrical components within an externally disposed, pressurized shell attached to an air-borne structure.

In the aerodynamic design of modern, high-speed aircraft, the demand for more compact aircraft structures has reduced the available space for accessory and electrical equipment to a minimum, whereas the electrical equipment necessary to operate the aircraft has substantially increased. Especially in the conversion of fighter aircraft to fighter-bomber aircraft, the problem has become critical, since available space for the addition of a bombing control system and other electronic accessories is practically nonexistent.

It has, therefore, been proposed to store the equipment within an external container or streamlined pod attached to the airframe. In the development of such a proposal, drag requirements which necessitate an extremely compact arrangement of the equipment must be considered in addition to the efficient operation, maintenance and cooling of the entire unit. Therefore, the packaging arrangement for the additional electrical equipment must be contoured and packaged tightly to present as low drag as possible. In addition, a plug-in and cooling means must be provided which will nevertheless permit ease of assembly, reliable operation and ready access for maintenance and inspection of equipment.

An additional problem concerns itself with the mounting and insulation of electrical equipment against vibration and other external forces imposed on the airframe structures in high-speed flight operations. To overcome the above difficulties and problems as set forth, it is accordingly the primary object and purpose of the present invention to provide a streamline, external store assembly aerodynamically designed for velocities above and below the speed of sound and capable of being sealed against high altitude conditions in which a unique design of shock-mounted ducts is utilized as a support chassis for the compact mounting of the electronic equipment within the external pod.

Additional objects and advantages of the present invention include the packaging of electronic equipment in such a way as to permit ease of assembly and disassembly for maintenance and shipping, together with a unique design to permit highly compact storage of the equipment within the container; and convenient and automatic electrical plug-in attachments between the electronic equipment and the airframe structure which permit ease of assembly and portability in handling.

Other objects and advantages of the present invention will occur to those skilled in the art upon reading the following description taken in conjunction with the accompanying drawing forming a part hereof in which:

Fig. 1 is an exploded perspective view of the packaging unit showing the relative disposition of the container sections and chassis sections for insertion within the container;

Fig. 2 is a side plan view of the fore chassis with the duct assembly partially broken away and shown in section to illustrate the rearward convergence of the duct;

Fig. 3 is a side plan view of the aft chassis showing in partial section the duct assembly parts broken away and shown in section;

Fig. 4 is an end view of the front support plate of the fore chassis;

Fig. 5 is an end view showing the back support plate of the fore chassis; and

Fig. 6 is an end view of the front support plate of the aft chassis.

Referring more particularly to the drawings, there is shown in Fig. 1 in disassembled relation a packaging unit 10 broadly comprised of a nose cone section 12, a fore chassis 15 and aft chassis 16 for insertion into the forward and rearward ends respectively of a tubular center section 13, and an aft cone 14 to inclose the rearward portion of the aft chassis 16. In assembled relation, the nose cone 12, the tubular center section 13 and the aft cone 14 constitute an elongate, streamlined pod or container inclosing the fore chassis 15 and aft chassis 16 for external attachment to an airframe (not shown) by means of shackles 17.

The nose cone 12 houses air cooling means for the entire packaging unit which is made up of an air inlet 20 and air outlet 21 to conduct air rammed into the air inlet means over the outside of a heat exchanger (not shown) and a blower motor (not shown) which circulates the air within the pod through the heat exchanger for cooling.

The pod center section 13 which forms the main housing assembly for the fore and aft chassis has a top guideway 23 made up of two parallel, L-shaped channel members, a bottom guideway or track 24 made up of two parallel, spaced channel members and a transverse electrical connector assembly 25 stationed within the center section 13 at a point substantially midway between the ends. The top L-shaped channel members are secured to the top inner surface of the center section in inwardly facing, spaced relation to one another. The bottom ducts or channel members are secured to the bottom inner surface of the center section 13 and extend in parallel, spaced relation the length of the center section. The electrical connector assembly 25 consists of a circular casting plate in which female socket members 26 are mounted; also, a centrally located duct opening 64 and alignment pins 27 project downwardly from opposite sides of the connector assembly.

The fore chassis 15 and aft chassis 16 are essentially alike, each having a frame carriage assembly 40 and 50 as shown in Figs. 2 and 3, made up of front support plates 41 and 51 respectively, and back support plates 42 and 52 connecting in parallel, spaced relation by means of top rail carriages 43 and 53 and bottom rail carriages 44 and 54 respectively, each support plate secured to the rail carriages by means of suitable braces 30 and rail brackets 31. The top rail carriages 43 and 53 are provided with bearing pins or rollers 32 passed transversely through the top rail carriages at spaced intervals along their length for rolling insertion of the carriages between the channel members 23. The bottom rail carriages 44 and 54 consist of a monorail between the bottom channel members 24 to center the chassis within the center section.

The back support plate 42 and front support plate 51 are identical, each having two diametrically opposed suspension openings 34 mating the alignment pins 27 and centrally located duct openings 65 which coincide with the duct opening 64 in the connector assembly 25. The front support plate 41 is equal in diameter to the tubular center section 13 and is provided with connector openings 34 spaced around the rim of the support plate to mate with the stud connectors 28 projecting from the forward, circular edge of the center section. An annular connector ring 55 is secured about the rearward portion of the top rail carriage 53 and bottom rail carriage 54 for connection to the stud connectors 28 spaced about the rearward edge of the center section.

A duct assembly 60 is made up of two separate sections, each suspended between the frame carriages 40 and 50 of the fore and aft chassis. The main body portion of each of the duct assembly portions is made up of two upright panels 61 disposed between the top and bottom rail carriages and spaced from each other by means of two elongate horizontal strips 62 connected to the top and bottom edges of the upright panels 61 so as to form a rectangular shaped, elongate beam having an opening throughout corresponding in cross section to the duct entrance 63 of the front support plate 41. The duct assembly 60 is further designed to rearwardly converge from the forward section in the fore chassis to its termination point located slightly behind connector ring 55 by means of transverse strips 66 secured to the sides of the panels 61 in the fore and aft portions of the duct assembly and gradually sloping towards each other throughout the assembly.

Each main body portion of the duct assembly 60 is shock mounted to each of the support plates by connecting duct end plates 67 to each end of the conduits. Each of the duct end plates 67 are, in turn, connected to the support plates by means of a vibration mount assembly consisting of dash pots 75 positioned on bracket mounts 76 extending from the support plates, and a plunger lever 77 interconnecting the dash pot plunger and end plates. Of course, the manner of mounting the vibration assembly between the duct assembly and support plates can be varied, as shown in Fig. 3 where the dash pots are interposed within openings 79 provided in the front support plate 51, and the end plate 67 is provided with arms to form the plunger lever 77. Plate stiffeners 68 are used throughout to secure each side of the main conduit portion to the end plates. The number of dash pots used in each vibration mount assembly will be determined by the load imposed by the duct assembly and associated electronic equipment in each section. For example, four dash pots are used between the front support plate of the fore chassis and the end plate, two being fastened on either side of the duct entrance, whereas only three are positioned behind the back support plate of the fore chassis in our preferred embodiment.

The duct assembly 60 is completed by providing duct extensions to interconnect the main conduit portions of the fore and aft chassis and to connect the forward end of the fore conduit portion with the outlet from the heat exchanger in the nose cone 12. These duct extensions consist of thick rubber gaskets 70 attached to the outer surface of the front support plate 41 about the duct entrance 63 to abut a gasket 70 extending from the heat exchanger outlet, and additional gaskets secured about the openings 65 to abut rubber gaskets secured about the opening 64 on each side of the connector 25. Mounted between each of the duct openings 63 and 65 and the end plate openings into the main conduit portions are accordion-shaped, flexible inclosures 71 forming a passageway between the duct openings and main conduit portion 60. In that the inclosures 71 are flexible, they co-operate with the vibration mount assembly in maintaining the main conduit sections in shock mounted relation within the frame carriages 50.

As will be noted in Figs. 1 and 3 the rearward duct end plate 67 which is secured to the back terminal portion of the aft duct assembly is mounted in a different manner with respect to the back support plate 52 than the other duct end plate connections. This end plate, which is located adjacent to and somewhat within the annular connector ring 55, is spaced from the vibration mount assembly by means of bar members 57 passed inside the top and bottom rail carriages 53 and 54, respectively, to secure the duct end plate 67 to an intermediate plate 58 connected to the plunger levers 77. In this way the air leaving the duct assembly exit is circulated directly over the electronic equipment which is mounted between the bar members 57.

Additional electronic equipment 72 which is to be placed on the upright panels 61 is shaped so that its outer contour forms substantially a semicircle conforming to the inner periphery of the tubular center section, and the inner surface of the equipment is made flat to coincide with the upright panel surfaces. The electronic equipment is securely fastened to the upright panel structure by providing at spaced intervals along the upright panels steel insertions 73 provided with threaded hole portions to engage captive screws 74 extending through the electronic equipment perpendicular to the upright panel portion.

In assembling the packaging unit, the fore and aft chassis are first inserted into the forward and rearward ends of the pod center section 13 by disposing the rollers 32 within the top guideway portion 23 and centering the bottom rail carriages 44 and 54 between the bottom channel members 24. Cable attachments (not shown) for the electronic equipment are provided on the back support plate 42 and front support plate 51 which mate with the female socket members 26 when the fore and aft chassis are fully inserted into the center section to thereby connect the electronic equipment 72 to a voltage source installed in the aft cone 14. Both the fore and aft chassis are lifted off the bottom guideway 24 by the downwardly sloping alignment pins 27 which force the back support plate 42 and front support plate 51 upwardly in mating with suspension openings 34. In lifting the fore and aft chassis off the bottom guideway, the chassis are maintained securely in position and thus more evenly distribute the vertical load of the electronic equipment to the entire pod center section. Both the nose cone 12 and aft cone 14 are securely attached to the forward and rearward ends of the pod center section 13 by means of slots 18 which mate with the connector openings 28. Upon insertion of the fore and aft chassis into the center section, the female socket members 26 provided on the connector assembly 25 will electrically connect the voltage source to the terminal air-frame plug-in board 19 located on the top outer surface of the center section 13.

In preparing the packaging unit for flight operations, the electronic equipment can be checked by opening sliding panels 22 located opposite the electronic equipment controls in the center section. If maintenance is required on either the fore or aft chassis, the cone sections 12 and 14 are removed and the frame carriages 40 and 50 slidably removed from the center section. After maintenance is completed the packaging unit is again assembled and the slide panels closed to seal the container. It is preferable to pressurize the pod to atmospheric pressure, particularly when utilized in high altitude flight operations.

In flight, air is forced rearwardly through the air inlet opening 20 by the forward movement of the aircraft, is circulated about the outer surface of the heat exchanger for cooling and released through the air outlet opening 21. The blower motor then circulates the air within the pod through the heat exchanger for cooling by the outside air and forces it rearwardly through the duct assembly. By rearwardly converging the conduits, a high velocity is maintained throughout the duct assembly which creates a turbulent air flow and scrubbing action to efficiently conduct the heat away from the upright panel portions. The cycle is completed by the movement of air back to the blower motor. Due to the high heat dissipation of the electrical equipment, circulation of the coolant air inwardly through the duct assembly as well as externally about the equipment is of great advantage, for not only can the flow of air be controlled to attain optimum heat transfer away from the equipment, but also a steady movement of air is maintained over the external surfaces of the electrical equipment. Of additional advantage is the compactness attained by using the duct portions as support panels to form a semi-cold plate design to rapidly conduct heat away from the packaged equipment. Also in place of the air-to-air heat exchange system as described, it is possible to provide a refrigerant system in which refrigerant vapor is circulated through the duct assembly and container.

In the construction of the packaging unit it is not always necessary to utilize two separate chassis sections; however, due to the length of the container in our preferred embodiment, it has been found to be of advantage to insert separate chassis sections from opposite ends of the center section to attain greater ease of assembly or disassembly. In addition, it is not necessary to provide the convergent transverse strips 66 throughout the entire duct assembly, since it would be possible to merely converge the aft section of the duct assembly and maintain the desired velocity throughout the conduits.

Other forms and modifications of the present invention, both with respect to their general arrangement and the details of the respective parts, can be provided to come within the scope and spirit of the present invention as more particularly defined in the appended claims.

What is claimed is:

1. A packaging unit for electronic equipment comprising an external container, and a chassis removably positioned within said container, said chassis including a duct assembly so constructed and arranged as to constitute the main support member for mounting of contoured electronic equipment within said container, said container including means for electrical and physical connection of said packaging unit to an airframe, said external container having a nose cone section adapted to circulate cooling air through said duct assembly.

2. In an external container for accommodating electrical apparatus, a frame to carry said electrical apparatus within said external container comprising support plates stationed at opposite ends of said external container, means interconnecting said support plates to mount said frame within said external container, and a relatively elongated duct positioned between said support plates in a substantially vibration-free mount, the walls of said duct acting to support the electrical apparatus in direct heat conducting relation with said duct, and means on the forward end of the external container adapted to deliver cooling air externally around said external container and in communication with the interior of said external container to simultaneously circulate cooling air inwardly through said duct.

3. In an external container for electrical apparatus, a chassis adapted for carriage by said external container comprising; means to support said chassis within said external container; means interconnecting said support means to slidably position said chassis within said external container; a rearwardly converging duct assembly having a main conduit portion disposed between said positioning means, and flexible duct extensions interconnecting said main conduit and said support means, said duct assembly resiliently mounted on said support means for resistance to vibration and for connection of the electrical apparatus thereto in direct thermal contact with the walls of said main conduit portion, and cooling air circulating means disposed within said external container in communication with said duct assembly.

4. The chassis according to claim 3 in which said main conduit portion includes two metallic side panels to support said electrical apparatus, said panels cooled by said circulating air so as to constitute cold plates absorbing heat dissipated by said electrical apparatus.

5. A chassis for the mounting and cooling of contoured electronic equipment within an elongate, streamlined pod externally attached to a high-speed aircraft wherein said pod includes a tubular section to accommodate said chassis, a voltage source, electrical terminal members to electrically connect said electronic equipment, and said aircraft, and nose cone means mounted on the forward end of said pod and adapted to supply cooling air to said chassis; said chassis comprising in combination: an open frame assembly having front and back support plates, and horizontal guide members holding said plates in vertical, spaced relation within said tubular section; a duct assembly constituting a beam member extending substantially the length of said frame support assembly for mounting of the electronic equipment thereon, said beam member having a recess portion passing therethrough to receive cooling air within said beam from said supply means; and means interconnecting said support plates and said beam to shock-mount said beam and electronic equipment against vibration and shock loads imposed thereon.

6. The chassis according to claim 5 in which said duct assembly is further characterized by rearwardly converging walls to induce rearward flow of said cooling air therethrough from said supply means.

7. The chassis according to claim 5 in which said beam member comprises two elongate side panels connected in vertical, spaced relation to form a duct of rectangular cross section, the contoured electronic equipment being mounted on said panels in direct thermal contact with said cooling air circulated through said duct.

8. The chassis according to claim 5 in which said electrical terminal members are characterized by male electronic equipment cable attachments mounted on one of said support plates and a permanently disposed transverse plate attached within said tubular section having female socket members to receive said male cable attachments upon insertion of said chassis within said tubular section, said socket members electrically connected to said airframe.

9. An electronic equipment packaging unit for external attachment to an airframe consisting essentially of: a streamlined, pressurized pod having a nose cone adapted to contain air cooling means, a tubular center section and aft cone adapted to contain an electric power source, said center section having a top guideway and a bottom guideway rearwardly extending along the top and bottom inner surface respectively of said center section, a plurality of connection members circumferentially spaced about the opposite ends of said center section, and a transverse, electrical connector assembly disposed within said center section having plug-in attachments electrically connected to said airframe; a mounting chassis for the electronic equipment including a fore chassis and an aft chassis insertable into the forward and rearward ends respectively of said center section, each chassis having a frame carriage comprised of a top rail having rollers slidably carried by said top guideway, a bottom rail centered on said bottom guideway, and front and back support plates maintaining said top and bottom rails in predetermined spaced relation, the back support plate of said fore chassis and front support plate of said aft chassis having cable attachments for connection to opposite sides of said connector assembly plug-in attachments, and said front support plate of said fore chassis and a connector ring carried by said aft chassis coupling with said connection members at the forward and rearward ends respectively of said center section so as to support said chassis within said pod; and a shock-resistant duct assembly in communication with said nose cone to receive cooling air therefrom comprising rearwardly converging, paneled conduits suspended between said top and bottom rails for mounting of the electronic equipment thereon in direct heat conductive relation, said paneled conduits interconnected by flexible duct extensions; a vibration resistant mount assembly interconnecting each support plate and paneled conduits to thereby protect said duct assembly and electronic equipment from destructive vibration and shock, said nose cone adapted to circulate air through said duct assembly whereby heat is absorbed from said paneled conduits, to thereby cool said electronic equipment.

References Cited in the file of this patent
UNITED STATES PATENTS

| | | |
|---|---|---|
| 1,537,228 | Gargan | May 12, 1925 |
| 2,113,421 | Camilli et al. | Apr. 5, 1938 |
| 2,516,184 | Christie | July 25, 1950 |
| 2,791,621 | Hewitt et al. | May 7, 1957 |
| 2,796,559 | Feucht | June 18, 1957 |